United States Patent
Sugisawa

(10) Patent No.: US 6,696,934 B2
(45) Date of Patent: Feb. 24, 2004

(54) METHOD AND APPARATUS FOR ALARMING DECREASE IN TIRE AIR-PRESSURE

(75) Inventor: Toshifumi Sugisawa, Kobe (JP)

(73) Assignees: Sumitomo Rubber Industries Ltd., Hyogo-ken (JP); Sumitomo Electric Industries, Ltd., Osaka-fu (JP)

(*) Notice: Subject to any disclaimer, the term of this patent is extended or adjusted under 35 U.S.C. 154(b) by 43 days.

(21) Appl. No.: 10/011,288

(22) Filed: Dec. 11, 2001

(65) Prior Publication Data
US 2002/0105419 A1 Aug. 8, 2002

(30) Foreign Application Priority Data
Dec. 14, 2000 (JP) .......................... 2000-380155

(51) Int. Cl.⁷ .............................................. B60C 23/00
(52) U.S. Cl. ................ 340/442; 340/443; 340/444; 340/445; 702/138; 701/70; 73/146.2; 73/146.3; 73/146.4; 73/146.5
(58) Field of Search ................ 340/442, 443, 340/444, 445; 702/138, 140, 148; 701/70; 73/146.2, 146.3, 146.4, 146.5

(56) References Cited

U.S. PATENT DOCUMENTS 6,182,021 B1 * 1/2001 Izumi et al. ................ 702/138

FOREIGN PATENT DOCUMENTS

| EP | 0 724 974 A1 | 8/1996 |
| JP | 5-213019 A | 8/1993 |
| JP | 6-286429 A | 10/1994 |
| JP | 6-286430 A | 10/1994 |
| JP | 7-40719 A | 2/1995 |
| JP | 8-268014 A | 10/1996 |

* cited by examiner

Primary Examiner—Daryl Pope
(74) Attorney, Agent, or Firm—Birch, Stewart, Kolasch & Birch, LLP

(57) ABSTRACT

A method for alarming decrease in tire air-pressure in which a decrease in internal pressure of a tire is detected on the basis of rotational information obtainable from wheels mounted to a vehicle and a driver is accordingly alarmed. A plurality of thresholds for judging bad road are set. Decrease in air-pressure of a tire can be judged and alarm is issued upon decrease in air-pressure also when running on a bad road so that it is possible to secure safe driving for the driver.

10 Claims, 2 Drawing Sheets

METHOD AND APPARATUS FOR ALARMING DECREASE IN TIRE AIR-PRESSURE

BACKGROUND OF THE INVENTION

1. Field of the Invention

The present invention relates to a method and apparatus for alarming decrease in tire air-pressure. More particularly, it relates to a method and apparatus for alarming decrease in tire air-pressure capable of judging a decrease in air-pressure of a tire also when running on a bad road for ensuring safe driving.

2. Description of Background Art

When running on a bad road such as a snowy road or a gravel road, wheel speeds are disturbed through slip so that there might be made erroneous judgements that an air-pressure of a tire has decreased while the tire is actually of normal internal pressure. For preventing such instances, a conventional system for alarming decrease in tire air-pressure for detecting decompression of a tire (DWS) based on rotational information of four wheels introduces a logic for rejecting data obtained while running on a bad road (bad road reject). When running on a bad road, variations in wheel speeds are caused through factors such as slip, and such bad road reject serves to reject data upon determining that the vehicle is running on a bad road in case a rate of such variations exceeds a certain value.

The bad road reject might be such that, in case rotational speeds of a front left tire, a front right tire, a rear left tire and a rear right tire are respectively defined as V1(FL), V2(FR), V3(RL), V4(RR), calculations are performed every second for obtaining (Front and rear wheel ratio on left)=$V1(FL)/V3(RL)$ (Front and rear wheel ratio on right)=$V2(FR)/V4(RR)$ (Difference in front and rear wheel ratio between right and left)= (front and rear wheel ratio on left)−(front and rear wheel ratio on right)

Judged value of bad road=|(difference in front and rear wheel ratio between right and left)−(previous difference in front and rear wheel ratio between right and left)|, wherein (i) In case the judged value of bad road≦threshold of good road
(1) A counter for normal good road surface (road surface that is not bad) is increment by 1.
(2) In case the counter for normal good road surface has reached 5, it is determined that it is a normal good road surface.
(3) Since values are maxing out, the counter for normal good road surface is set to 4, and counting is performed starting at step (1).
(ii) In case the threshold of good road<judged value of bad road≦threshold of bad road
(1) The counter for normal good road surface is set to zero.
(2) The previous judgement is maintained for judging whether the road surface is bad or good.
(iii) In case the threshold of good road<judged value of bad road
(1) The counter for normal good road surface is set to zero.

(2) It is determined that the road surface is bad, and running data are rejected.

Other conditions for rejection are, for instance, low speed running, cornering, lateral directional acceleration (lateral G), acceleration or braking. Only running data which did not fall under these conditions for rejections are employed for judging air-pressure. An equation for obtaining a judged value which is used in judging air-pressure is given by $DEL=\{(V1(FL)+V4(RR))/2-(V2(FR)+V3(RL)/2)\}/\{V1(FL)+V2(FR)+V3(RL)+V4(RR)/4\}\times100(\%)$ In this manner, data were conventionally rejected when running on a bad road and judgements of air-pressure were not performed.

When running on a snowy road or a gravel load over a long period of time, no correct judgement of air-pressure can be performed owing to disturbances caused in wheel speeds so that no alarm can be issued even if a decrease in air-pressure has progressed to a remarkable extent, and it might happen that a driver is not aware of a blowout of tire until the tire finally bursts.

The present invention has been made in view of these facts, and it is an object thereof to provide a method and apparatus for alarming decrease in tire air-pressure capable of judging a decrease in air-pressure of a tire also when running on a bad road for ensuring safe driving.

SUMMARY OF THE INVENTION

In accordance with the present invention, there is provided a method for alarming decrease in tire air-pressure in which a decrease in internal pressure of a tire is detected on the basis of rotational information obtainable from wheels mounted to a vehicle and a driver is accordingly alarmed, wherein a plurality of thresholds for judging bad road are set.

In accordance with the present invention, there is further provided a method for alarming decrease in tire air-pressure in which a decrease in internal pressure of a tire is detected on the basis of rotational information obtainable from wheels mounted to a vehicle and a driver is accordingly alarmed, comprising the steps of: detecting rotational signals of respective tires, storing rotational information upon calculation of the rotational signals of the respective tires, setting a plurality of thresholds for judging air-pressure and setting a plurality of thresholds for judging bad road to meet the plurality of thresholds for judging air-pressure, judging, on the basis of rotational information of the respective tires, that the vehicle is running on a bad road, and judging decrease in air-pressure of a tire on the basis of a judged value which is calculated from the rotational information of the respective tires.

In accordance with the present invention, there is also provided an apparatus for alarming decrease in tire air-pressure in which a decrease in internal pressure of a tire is detected on the basis of rotational information obtainable from wheels mounted to a vehicle and a driver is accordingly alarmed, the apparatus comprising a threshold setting means for setting a plurality of thresholds for judging bad road.

In accordance with the present invention, there is yet further provided an apparatus for alarming decrease in tire air-pressure in which a decrease in internal pressure of a tire is detected on the basis of rotational information obtainable from wheels mounted to a vehicle and a driver is accordingly alarmed, comprising: a speed detecting means for detecting rotational signals of respective tires, an information storing means for storing rotational information upon calculation of the rotational signals of the respective tires, a threshold setting means for setting a plurality of thresholds for judging air-pressure and for setting a plurality of thresholds for judging bad road to meet the plurality of thresholds for judging air-pressure, a bad road judging means for judging, on the basis of rotational information of the respective tires, that the vehicle is running on a bad road, and a decompression judging means for judging decrease in air-pressure of a tire on the basis of a judged value which is calculated from the rotational information of the respective tires.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram illustrating one embodiment of the apparatus for alarming decrease in tire air-pressure according to the present invention; and.

DETAILED DESCRIPTION OF THE PREFERRED EMBODIMENTS

The method and apparatus for alarming decrease in tire air-pressure will now be explained with reference to the accompanying drawings.

Figure 1:
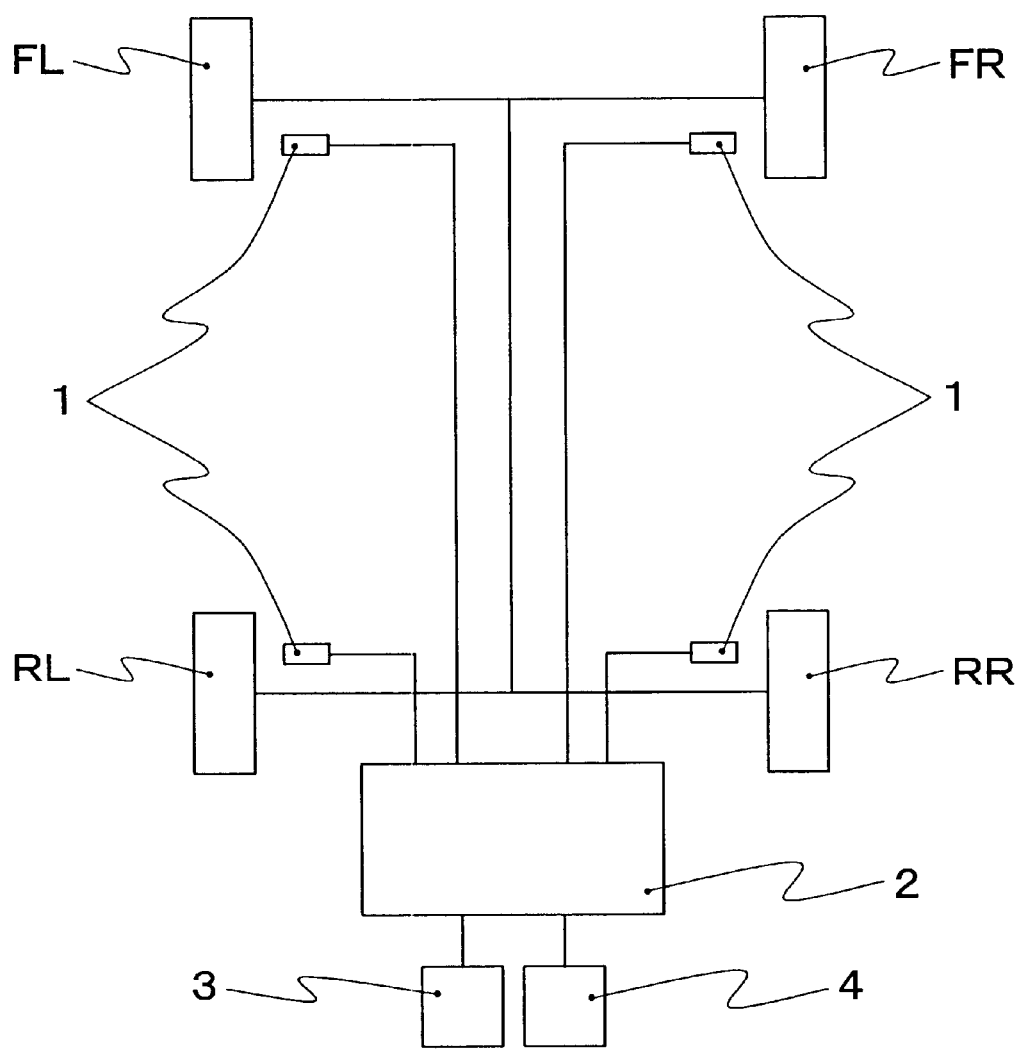
Figure 2:
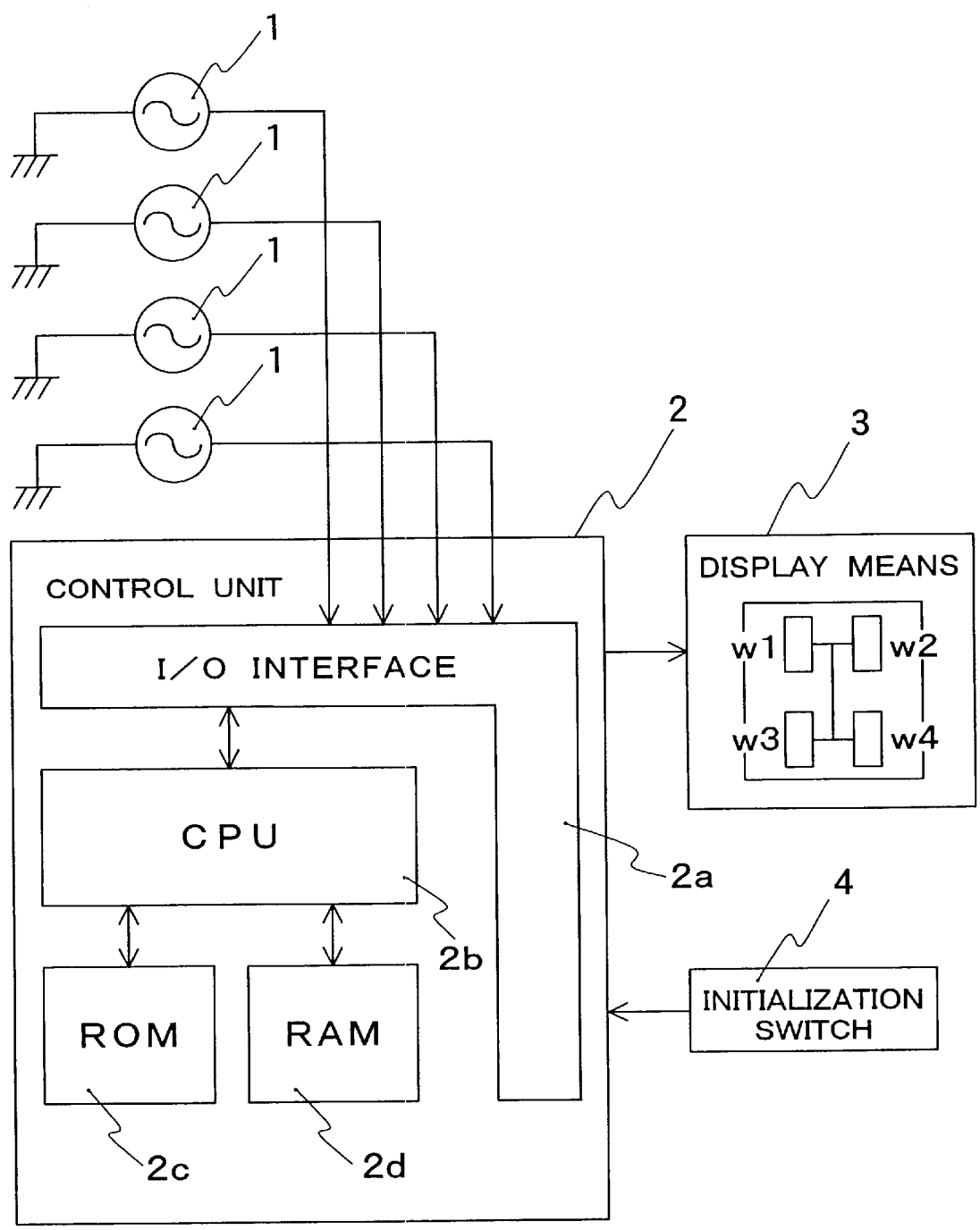
FIG. 2 is a block diagram illustrating electric arrangements of the apparatus for alarming decrease in tire air-pressure according to the present invention.

As shown in FIG. 1, an embodiment of an apparatus for alarming decrease in tire air-pressure according to the present invention is so designed as to detect whether or not pneumatic pressures of four tires FL, FR, RL and RR (front left tire, front right tire, rear left tire, and rear right tire; hereinafter representatively referred to as $W_i$) attached to, for example, a vehicle are decreased, and is provided with a wheel speed sensor 1, which is a popular speed detecting means, respectively provided in connection with each tire $W_i$. Output of the wheel speed sensor 1 is applied to a control unit 2. To the control unit 2, a display device 3 for informing of the tire $W_i$ having a decreased pneumatic pressure, the display device 3 being constituted by a liquid crystal display element, a plasma display element, a CRT or the like, and an initialization switch 4 capable of being operated by a driver are connected.

The control unit 2 includes an I/O interface 2a required for giving and taking a signal with respect to an external device, a CPU 2b functioning as a center of a calculating process, a ROM 2c storing a control operation program of the CPU 2b and a RAM 2d in which data is temporarily written or the written data is read at a time when the CPU 2b executes the control operation.

In this embodiment, the apparatus comprises a wheel speed sensor 1 for detecting rotational signals of respective tires, an information storing means for storing rotational information upon calculation of the rotational signals of the respective tires, a threshold setting means for setting a plurality of thresholds for judging air-pressure and for setting a plurality of thresholds for judging bad road to meet the plurality of thresholds for judging air-pressure, a bad road judging means for judging, on the basis of rotational information of the respective tires, that the vehicle is running on a bad road, and a decompression judging means for judging decrease in air-pressure of a tire on the basis of a judged value which is calculated from the rotational information of the respective tires. The information storing means, the threshold setting means, the bad road judging means and the decompression judging means in the present invention are included in the control unit 2. It should be noted that a bad road indicates conditions of a snowy road or a gravel road.

In the wheel speed sensor 1, a rotational signal corresponding to the number of revolutions of each of tires $W_i$ (hereinafter referred to as a wheel speed pulse) is output. A CPU 2b calculates a rotational angular velocity $F_i$ of each of the tires $W_i$ per predetermined sampling cycle $\Delta T$ (sec.), for example, per second based on the wheel speed pulse output from the wheel speed sensor 1.

Here, since tires $W_i$ are manufactured while irregularity is present within a specification (initial difference), the effective rolling radii of the tires $W_i$ (values each obtained by dividing a distance advancing by one rotation by $2\pi$) are not necessarily equal even if all of the tires $W_i$ have ordinary internal pressure. As a result, the rotational angular velocities $F_i$ of the tires $W_i$ become irregular. Considering this, a corrected rotational angular velocity $F1_i$ to cancel the irregularity due to the initial difference is calculated. To be specific, the respective rotational angular velocity is corrected as follows:

$$F1_1 = F_1$$
$$F1_2 = mF_2$$
$$F1_3 = F_3$$
$$F1_4 = nF_4$$

Correction coefficients m and n are obtained as $m = F_1/F_2$ and $n = F_3/F_4$ by calculating the rotational angular velocity $F_i$ under conditions, for example, that a vehicle is running on a straight road and then obtaining the coefficients m and n based on the calculated rotational angular velocity $F_i$.

Based on $F1_i$, a speed V of the vehicle (Vi/4), a slip rate or lateral directional acceleration (lateral G) and others are calculated.

Known methods for judging that the vehicle is running on bad road are, for instance, a method in which judgements are performed by using the above-explained equation "judged value of bad road=|(difference in front and rear wheel ratio between right and left)−(previous difference in front and rear wheel ratio between right and left)|", or a method of determining a bad road in case amounts of change in differences between right slip rate and left slip rate (front and rear wheel ratio−1) are large.

The judged value of decompression (DEL) for detecting decrease in air-pressure of a tire Wi compares a difference between two diagonal sums of, for instance, front wheel tires and rear wheel tires and is obtained as a ratio of a value obtained by subtracting a sum of signals of one pair of diagonally located wheels from a sum of signals of another pair of diagonally located wheels to an average value of these two sums.

Running tests were performed by using a vehicle in which an internal pressure (air-pressure) of one of the mounted tires was decompressed by 30% from a normal internal pressure for calculating a judged value of decompression, and it was found that the value was approximately 0.18%. A judged value of decompression calculated based on this test result with a lower limit being defined as partial decompression of a tire (8.3%) will be approximately 0.05%, while a judged value of decompression calculated with an upper limit being defined as a complete decompression of a tire (100%) will be approximately 0.6%.

As discussed above, a DWS is capable of detecting a decrease in air-pressure by approximately 30% from a reference internal pressure. Since a rate of change in wheel speed in case the air-pressure has decreased by 30% is approximately 0.18%, a threshold for bad road reject is defined to be a strict one (with a trend of being rejected).

However, in case detection shall be performed with a rate of decrease in air-pressure being, for instance, 50%, no erroneous alarm will be issued through some disturbances in judged values when running on bad road even when somewhat easing conditions for bad road reject (with a trend of being not rejected) are employed.

Thus, while data are eliminated in case it is determined that the vehicle is running on a bad road when the vehicle is running on a bad road such as snowy road or gravel road, a threshold for such instances will be set to a plurality of stages so as to set thresholds for determining bad road which are usually employed as well as thresholds for determining bad road which are employed when it is determined that a rate of decrease in air-pressure of a tire is large.

In this manner, by setting a plurality of judged values of air-pressure (for instance, a judged value for judging decrease by 30%, a judged value for judging decrease by 40% etc.) and setting thresholds for bad road reject for each of these, opportunities for judging air-pressure will be increased without issuing erroneous alarm, and it is accordingly possible to ensure safe driving for the driver. More particularly, a plurality of judged values employed for judging air-pressure are set and thresholds employed for judging bad road will also be set by a corresponding number.

Thus, by setting the threshold for judging bad road to become larger the worse the road surface is to meet the degree of bad road on which the vehicle is running, chances in which data are not be rejected but employed for judging a decrease in air-pressure will be increased in case the decrease in air-pressure has progressed to a remarkable extent, even under road surface conditions in which road has been judged to be bad to thereby reject data and possibilities in which alarm is issued can be accordingly increased.

While the present invention will now be explained based on examples thereof, the present invention is not to be limited to such examples only.

EXAMPLES and COMPARATIVE EXAMPLES

An FF vehicle with an engine displacement of 3,000 cm$^3$ was used as a test vehicle while providing an arrangement in which wheel speeds are taken into a personal computer for processing on the personal computer a program which was set according to Table 1. The sampling time for the rotational speed of the wheels was set to 1 second.

TABLE 1

|  | Comparative example |  | Example |
|---|---|---|---|
| Threshold for judging air-pressure | 0.1 | a | 0.1 |
|  |  | b | 0.13 |
|  |  | c | 0.15 |

TABLE 1-continued

|  | Comparative example |  | Example |
|---|---|---|---|
| Rate of decompression for judging alarm | Approximately 30% | a | Approximately 30% |
|  |  | b | Approximately 40% |
|  |  | c | Approximately 50% |
| Threshold for judging good road | 0.001 | a | 0.001 |
|  |  | b | 0.0015 |
|  |  | c | 0.002 |
| Threshold for judging bad road | 0.0035 | a | 0.0035 |
|  |  | b | 0.005 |
|  |  | c | 0.007 |

Next, the tire of the front left wheel of the above vehicle was decompressed by 50%, and the vehicle was made to run on a frozen snowy road surface within a test course at a speed of approximately 30 km/h.

By using a judged value for air-pressure (DEL), an average value DEL 5 of the last n-number, for instance, five DEL values (DEL(n)) and an average value DELAV of the last n-number, for instance, 12 DEL values (DEL 5(n)) of this DEL 5 were respectively calculated using the following equations, and decompression was judged by using this DELAV. Here, i indicates a, b and c of Table 1.

$$DEL\ i=\{(V(FL)+V(RR))-(V(FR)+V(RL))\}/\{V(FL)+V(FR)+V(RL)+V(RR)\}\times 50(\%)$$

$$DEL\ 5i=\{DEL\ i(1)+DEL\ i(2)+DEL\ i(3)+DEL\ i(4)+DEL\ i(5)\}/5$$

$$DELAVi=\{DEL\ 5i(1)+DEL\ 5i(2)+DEL\ 5i(3)+\ldots+DEL\ 5i(11)+DEL\ 5i(12)\}/12$$

In a comparative example, alarm was issued upon determining that a decompression of approximately 30% has occurred in case an absolute value (DELAV) of a value corresponding to an average of one minute of judged values of air-pressure (DEL) has exceeded 0.1. A threshold for judging bad road was set to 0.0035 while a threshold for judging good road was set to 0.001. Bad road reject was performed on the basis of the above-discussed conventional logic for judging bad road. The equation for calculation was as follows:

$$DEL=\{(V(FL)+V(RR))\}-(V(FR)+V(RL))\}/\{V(FL)+V(FR)+V(RL)+V(RR)\}\times 50(\%)$$

$$DEL5=\{DEL(1)+DEL(2)+DEL(3)+DEL(4)+DEL(5)\}/5$$

$$DELAV=\{DEL5(1)+DEL5(2)+DEL5(3)+\ldots+DEL5(11)+DEL5(12)\}/12$$

It was found through these tests that while effective data could be acquired for issuing alarm upon decrease in air-pressure during running in the present example, running data were rejected and no alarm was issued in the comparative example.

As explained so far, according to the present invention, decrease in air-pressure of a tire can be judged and alarm is issued upon decrease in air-pressure also when running on a bad road so that it is possible to secure safe driving for the driver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for alarming a decrease in tire air-pressure in which a decrease in internal pressure of a tire is detected on the basis of rotational information obtainable from wheels mounted to a vehicle and a driver is accordingly alarmed, comprising the steps of:

detecting rotational signals of respective tires;

storing rotational information upon calculation of the rotational signals of the respective tires;

setting a plurality of thresholds for judging air-pressure when the vehicle is traveling on a bad road;

judging, on the basis of rotational information of the respective tires, that the vehicle is traveling on a bad road; and judging a decrease in air-pressure of a tire on the basis of a judged value which is calculated from the rotational information of the respective tires, when it has been judged that the vehicle is traveling on a bad road.

2. The method according to claim 1, further comprising the step of setting a plurality of thresholds for judging whether the vehicle is traveling on a bad road on the basis of the rotational information of the respective tires.

3. A method for alarming a decrease in tire air-pressure in which a decrease in internal pressure of a tire is detected on the basis of rotational information obtainable from wheels mounted to a vehicle and a driver is accordingly alarmed, comprising the step of:

setting a plurality of thresholds for judging air-pressure when the vehicle is traveling on a bad road.

4. The method according to claim 3, further comprising the step of setting a plurality of thresholds for judging whether the vehicle is traveling on a bad road on the basis of the rotational information of the respective tires.

5. The method according to claim 4, further comprising the steps of:

judging on the basis of rotational information of the respective tires, that the vehicle is running on a bad road; and judging a decrease in air-pressure of a tire on the basis of a judged valve which is calculated from the rotational information of the respective tires, when it has been judged that the vehicle is traveling on a bad road.

6. An apparatus for alarming a decrease in tire air-pressure in which a decrease in internal pressure of a tire is detected on the basis of rotational information obtainable from wheels mounted to a vehicle and a driver is accordingly alarmed, the apparatus comprising:

a threshold setting means for setting a plurality of thresholds for judging air-pressure when the vehicle is traveling on a bad road.

7. The apparatus according to claim 6, further comprising means for setting a plurality of thresholds for judging whether the vehicle is traveling on a bad road on the basis of the rotational information of the respective tires.

8. The apparatus according to claim 7 further comprising:

a bad road judging means for judging on the basis of rotational information of the respective tires, that the vehicle is running on a bad road; and a decompression judging means for judging a decrease in air-pressure of a tire on the basis of a judged valve which is calculated from the rotational information of the respective tires, when it has been judged that the vehicle is traveling on a bad road.

9. An apparatus for alarming a decrease in tire air-pressure in which a decrease in internal pressure of a tire is detected on the basis of rotational information obtainable from wheels mounted to a vehicle and a driver is accordingly alarmed, comprising:

a speed detecting means for detecting rotational signals of respective tires;

an information storing means for storing rotational information upon calculation of the rotational signals of the respective tires;

a threshold setting means for setting a plurality of thresholds for judging air-pressure when the vehicle is traveling on a bad road;

a bad road judging means for judging, on the basis of rotational information of the respective tires, that the vehicle is traveling on a bad road; and a decompression judging means for judging a decrease in air-pressure of a tire on the basis of a judged value which is calculated from the rotational information of the respective tires when it has been judged that the vehicle is traveling on a bad road.

10. The apparatus according to claim 9, further comprising means for setting a plurality of thresholds for judging whether the vehicle is traveling on a bad road on the basis of the rotational information of the respective tires.

* * * * *